(12) United States Patent
Yamagishi et al.

(10) Patent No.: US 10,626,983 B2
(45) Date of Patent: Apr. 21, 2020

(54) AUTOMATIC TRANSMISSION

(71) Applicant: Honda Motor Co., Ltd., Tokyo (JP)

(72) Inventors: Ryohei Yamagishi, Saitama (JP); Yuya Tachibanada, Saitama (JP); Yutaka Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 15/922,864

(22) Filed: Mar. 15, 2018

(65) Prior Publication Data
US 2018/0283539 A1 Oct. 4, 2018

(30) Foreign Application Priority Data

Mar. 30, 2017 (JP) .................................. 2017-068707

(51) Int. Cl.
| | |
|---|---|
| *F16H 61/22* | (2006.01) |
| *F16H 61/02* | (2006.01) |
| *F16H 61/686* | (2006.01) |
| *F16H 59/42* | (2006.01) |
| *F16H 59/72* | (2006.01) |
| *F16H 59/10* | (2006.01) |
| *F16H 3/56* | (2006.01) |
| *F16H 59/44* | (2006.01) |
| *F16H 59/36* | (2006.01) |

(Continued)

(52) U.S. Cl.
CPC ......... *F16H 61/0251* (2013.01); *F16H 59/42* (2013.01); *F16H 61/22* (2013.01); *F16H 61/686* (2013.01); *F16D 1/00* (2013.01); *F16H 3/56* (2013.01); *F16H 3/66* (2013.01); *F16H 59/10* (2013.01); *F16H 59/44* (2013.01); *F16H 59/72* (2013.01); *F16H 61/12* (2013.01); *F16H 2059/366* (2013.01); *F16H 2061/026* (2013.01); *F16H 2061/1276* (2013.01); *F16H 2200/0069* (2013.01); *F16H 2200/203* (2013.01); *F16H 2200/2012* (2013.01); *F16H 2200/2048* (2013.01); *F16H 2200/2066* (2013.01); *F16H 2200/2082* (2013.01)

(58) Field of Classification Search
CPC .... F16H 61/0251; F16H 59/42; F16H 61/686; F16H 61/22; F16H 57/0434; F16H 57/0413
See application file for complete search history.

(56) References Cited

U.S. PATENT DOCUMENTS

| | | | | |
|---|---|---|---|---|
| 4,944,200 A | * | 7/1990 | Benford | ............... F16H 61/0246 475/129 |
| 5,211,080 A | * | 5/1993 | Leising | ............... F16H 61/0206 475/120 |

(Continued)

FOREIGN PATENT DOCUMENTS

JP  2015175401  10/2015

*Primary Examiner* — Patrick H Mackey
(74) *Attorney, Agent, or Firm* — JCIPRNET

(57) ABSTRACT

Provided is an automatic transmission capable of smoothly switching a switching mechanism. A control part ECU of a transmission recognizes an input torque and a friction torque when an instruction to switch a two-way clutch from a fixed state to a reverse rotation prevention state is received while a first clutch, a second clutch and a third clutch are in an open state, and switches the two-way clutch from the fixed state to the reverse rotation prevention state when the input torque is equal to or greater than the friction torque.

2 Claims, 12 Drawing Sheets

(51) Int. Cl.
*F16H 61/12* (2010.01)
*F16H 3/66* (2006.01)
*F16D 1/00* (2006.01)

(56) References Cited

U.S. PATENT DOCUMENTS

| | | | | |
|---|---|---|---|---|
| 5,593,365 | A * | 1/1997 | Tabata | F16H 61/702 |
| | | | | 477/119 |
| 5,709,140 | A * | 1/1998 | Hirose | F16H 61/0276 |
| | | | | 91/459 |
| 5,947,856 | A * | 9/1999 | Tabata | F16H 61/061 |
| | | | | 475/117 |
| 7,540,824 | B2 * | 6/2009 | Hinami | F16H 61/16 |
| | | | | 477/126 |
| 8,182,397 | B2 * | 5/2012 | Shimizu | F16H 61/0206 |
| | | | | 475/119 |
| 9,193,345 | B2 * | 11/2015 | Ishikawa | F16H 61/0246 |
| 9,199,629 | B2 * | 12/2015 | Ishikawa | F16H 61/16 |
| 9,789,872 | B2 * | 10/2017 | Satozono | B60W 30/18036 |
| 2006/0048643 | A1 * | 3/2006 | Mohlmann | F16H 61/2807 |
| | | | | 91/444 |
| 2011/0010063 | A1 * | 1/2011 | Ota | B60K 6/365 |
| | | | | 701/58 |
| 2014/0038764 | A1 * | 2/2014 | Goleski | F16H 3/66 |
| | | | | 475/275 |

* cited by examiner

| | C1 | C2 | C3 | B1 | B2 | B3 | F1 | gear shift ratio | common ratio |
|---|---|---|---|---|---|---|---|---|---|
| Rvs |  |  | ○ |  | ○ |  | L | 4.008 |  |
| 1st |  |  | ○ | (○) |  |  | R/L | 5.233 | 1.554 |
| 2nd |  | ○ |  | ○ | ○ |  | R | 3.367 | 1.465 |
| 3rd |  |  | ○ | ○ | ○ |  | R | 2.298 | 1.348 |
| 4th |  | ○ | ○ | ○ |  |  | R | 1.705 | 1.251 |
| 5th | ○ | (○) | ○ |  |  |  | R | 1.363 | 1.363 |
| 6th | ○ | ○ | ○ |  |  |  | R | 1.000 | 1.273 |
| 7th | ○ |  | ○ |  | ○ |  | R | 0.786 | 1.196 |
| 8th | ○ | ○ |  |  | ○ |  | R | 0.657 | 1.126 |
| 9th | ○ |  |  |  | ○ | ○ | R | 0.584 | 1.120 |
| 10th | ○ | ○ |  |  |  | ○ | R | 0.520 |  | ated
AUTOMATIC TRANSMISSION

CROSS-REFERENCE TO RELATED APPLICATION

This application claims the priority of Japan patent application serial no. 2017-068707, filed on Mar. 30, 2017. The entirety of the above-mentioned patent application is hereby incorporated by reference herein and made a part of this specification.

BACKGROUND

Technical Field

The disclosure relates to an automatic transmission with a planetary gear mechanism and an engagement mechanism.

Description of Related Art

Conventionally, an automatic transmission with a planetary gear mechanism having a plurality of elements rotatable within a casing and a plurality of engagement mechanisms switchable to a connected state in which the elements are connected to each other or switchable to a fixed state in which the elements are fixed to the casing is known.

In this type of automatic transmission, using a frictional engagement mechanism as an engagement mechanism which is switchable between the connected state or the fixed state and an open state in which the connected state or the fixed state is released is known. Further, using a switching mechanism (for example, a two-way clutch) as an engagement mechanism, which is switchable between a reverse rotation prevention state in which normal rotation of elements of the planetary gear mechanism is allowed and reverse rotation thereof is prevented and a fixed state, together with the frictional engagement mechanism is also known (for example, refer to Patent Document 1).

[Patent Document 1] Japanese Patent Publication No. 2015-175401

However, in a conventional automatic transmission as described in Patent Document 1, even when the frictional engagement mechanism is in the open state, a force may be unexpectedly transmitted to the element corresponding to the frictional engagement mechanism. For example, in the case in which a lubricating fluid is supplied to the frictional engagement mechanism, even when the frictional engagement mechanism is in the open state (that is, in a state in which there is an interval between friction members), a force (friction torque) may be unexpectedly transmitted to the element corresponding to the frictional engagement mechanism due to viscous resistance of the lubricating fluid present between the friction members.

Additionally, due to the friction torque, a force which fixes the member constituting the switching mechanism may be unexpectedly applied. Even when a switching operation of the switching mechanism is instructed in the state in which such a fixing force is applied, the switching operation may not be performed.

SUMMARY

An aspect of the disclosure is to provide an automatic transmission capable of smoothly switching a switching mechanism.

An embodiment of the disclosure provides an automatic transmission (for example, a transmission 3 in the embodi-ment, the same below) mounted in a vehicle (for example, a vehicle V in the embodiment, the same below) which includes an input member (for example, an input shaft 32 in the embodiment, the same below) disposed inside a casing (for example, a transmission case 31 in the embodiment, the same below) and configured to rotate by receiving a driving force from a driving source (for example, an engine E in the embodiment, the same below), a planetary gear mechanism (for example, a first planetary gear mechanism PG1, a second planetary gear mechanism PG2, a third planetary gear mechanism PG3 and a fourth planetary gear mechanism PG4 in the embodiment, the same below) having a plurality of elements (for example, carriers Ca, Cb, Cc and Cd, ring gears Ra, Rb, Rc and Rd, sun gears Sa, Sb, Sc and Sd in the embodiment, the same below) rotatable inside the casing, a plurality of engagement mechanisms (for example, a first brake B1, a second brake B2, a third brake B3, a first clutch C1, a second clutch C2, a third clutch C3 and a two-way clutch F1 in the embodiment, the same below) which are switchable to a connected state in which the plurality of elements are connected to each other or are switchable to a fixed state in which the plurality of elements are fixed to the casing, an output member (for example, an output member 33 in the embodiment, the same below) configured to output rotation, and a control part (for example, a control ECU in the embodiment, the same below) configured to control the engagement mechanisms. The automatic transmission is mounted in a vehicle, the vehicle transfers a rotation of the input member into a plurality of gear shift stages by the planetary gear mechanism and the engagement mechanism and outputs from the output member. The automatic transmission further comprising:

a lubricating fluid supply mechanism (for example, a hydraulic control circuit HC in the embodiment, the same below) configured to supply a lubricating fluid (for example, a lubricating oil in the embodiment, the same below) to one of the plurality of elements, an output member rotation speed detector (for example, a vehicle speed detector 54 in the embodiment, the same below) configured to detect a rotation speed of the output member, and a driving source output detector (for example, a driving source rotation speed detector 53 in the embodiment, the same below) configured to detect an output of the driving source, wherein each of the plurality of engagement mechanisms comprises:

a switching mechanism (for example, a two-way clutch F1 in the embodiment, the same below) corresponding to a predetermined element among the plurality of elements and capable of switching between a reverse rotation prevention state configured to allow normal rotation of the predetermined element and to prevent reverse rotation of the predetermined element, and the fixed state, and a frictional engagement mechanism (for example, a first clutch C1, a second clutch C2 and a third clutch C3 in the embodiment, the same below) capable of switching between the connected state or the fixed state and an open state for releasing the connected state or the fixed state, the switching mechanism comprises a first member (for example, a fixing plate TW11 in the embodiment, the same below) fixed to the casing, a second member (for example, a rotating plate TW12 in the embodiment, the same below) connected to the predetermined element (for example, a carrier Cb in the embodiment, the same below) corresponding to the switching mechanism and configured to perform normal rotation or reverse rotation with respect to the first member, and a switching member (for example, a normal rotation prevention side swinging portion TW13 in the embodiment, the same below) installed on the first member and engageable with the second member, the switching member prevents normal rotation of the second member at a time of engaging with the second member and causes the predetermined element corresponding to the switching mechanism to be in the fixed state and allows normal rotation of the second member at a time of not engaging with the second member and causes the predetermined element corresponding to the switching mechanism to be in the reverse rotation prevention state, an input torque varying on a basis of the output of the driving source and a friction torque in a direction opposite to the input torque are input to the second member, wherein the friction torque is generated by the lubricating fluid present inside the frictional engagement mechanism and varying on a basis of the rotation speed of the output member, and the control part recognizes the input torque and the friction torque when an instruction to switch the switching mechanism from the fixed state to the reverse rotation prevention state is received while the frictional engagement mechanism is in the open state, and switches the switching mechanism from the fixed state to the reverse rotation prevention state while the input torque is equal to or greater than the friction torque.

Further, the "output of the driving source" includes a torque as well as a rotational speed, and the control part may directly measure and recognize the output, or may recognize the output by calculation on the basis of the rotation speed of the input member or the like. Further, the control part may recognize the "rotation speed of the output member" by directly measuring the rotation speed of the output member, or may recognize it by calculation on the basis of the vehicle speed or the like.

Further, the automatic transmission provided in an embodiment of the disclosure may include a temperature detector (for example, an oil temperature detector HC5 in the embodiment, the same below) configured to detect a temperature of the lubricating fluid, and the control part may recognize the friction torque applied to the switching mechanism due to the lubricating fluid present inside the frictional engagement mechanism on a basis of the rotation of the output member and the temperature.

BRIEF DESCRIPTION OF THE DRAWINGS

FIGS. 9A and 9B are explanatory views illustrating a switching control mechanism for switching the two-way clutch of the transmission of FIG. 2, wherein FIG. 9A illustrates a case in which the two-way clutch is in the fixed state, and FIG. 9B illustrates a case in which the two-way clutch is in the reverse rotation prevention state.

DESCRIPTION OF THE EMBODIMENTS

As described above, in the automatic transmission of the disclosure, the switching of an operation of the second member is performed by the switching member of the switching mechanism. Additionally, the input torque varying on the basis of the output of the driving source and the friction torque in a direction opposite to the input torque are inputted to the second member. The friction torque is generated by the lubricating fluid present inside the frictional engagement mechanism and varying on the rotation speed of the output member.

That is, the input torque applied to the switching mechanism from an input side in a normal state and the friction torque unexpectedly applied to the switching mechanism from an output side are input to the second member. As a result, when the friction torque is greater than the input torque, there is a risk that a fixing force will be unexpectedly applied to the switching member.

Therefore, in the automatic transmission of the disclosure, the switching of the switching mechanism from the fixed state to the reverse rotation prevention state by the control part is performed in a state when the input torque is equal to or greater than the friction torque (that is, in a state in which a force for fixing the switching member is not applied). Therefore, according to the automatic transmission of the disclosure, the switching mechanism can be switched smoothly.

Since a viscous resistance varies according to the temperature of the lubricating fluid supplied to a space between the friction members of the frictional engagement mechanism, the friction torque caused by the lubricating fluid also varies according to the temperature of the lubricating fluid. Therefore, if in addition to the rotation speed of the output member, the temperature of the lubricating fluid is also referred to as variables for recognizing the friction torque, more accurate control can be performed. As a result, it is possible to switch the switching mechanism more smoothly.

Hereinafter, a vehicle in which a transmission (automatic transmission) according to an embodiment is mounted will be described with reference to the drawings.

Figure 1:
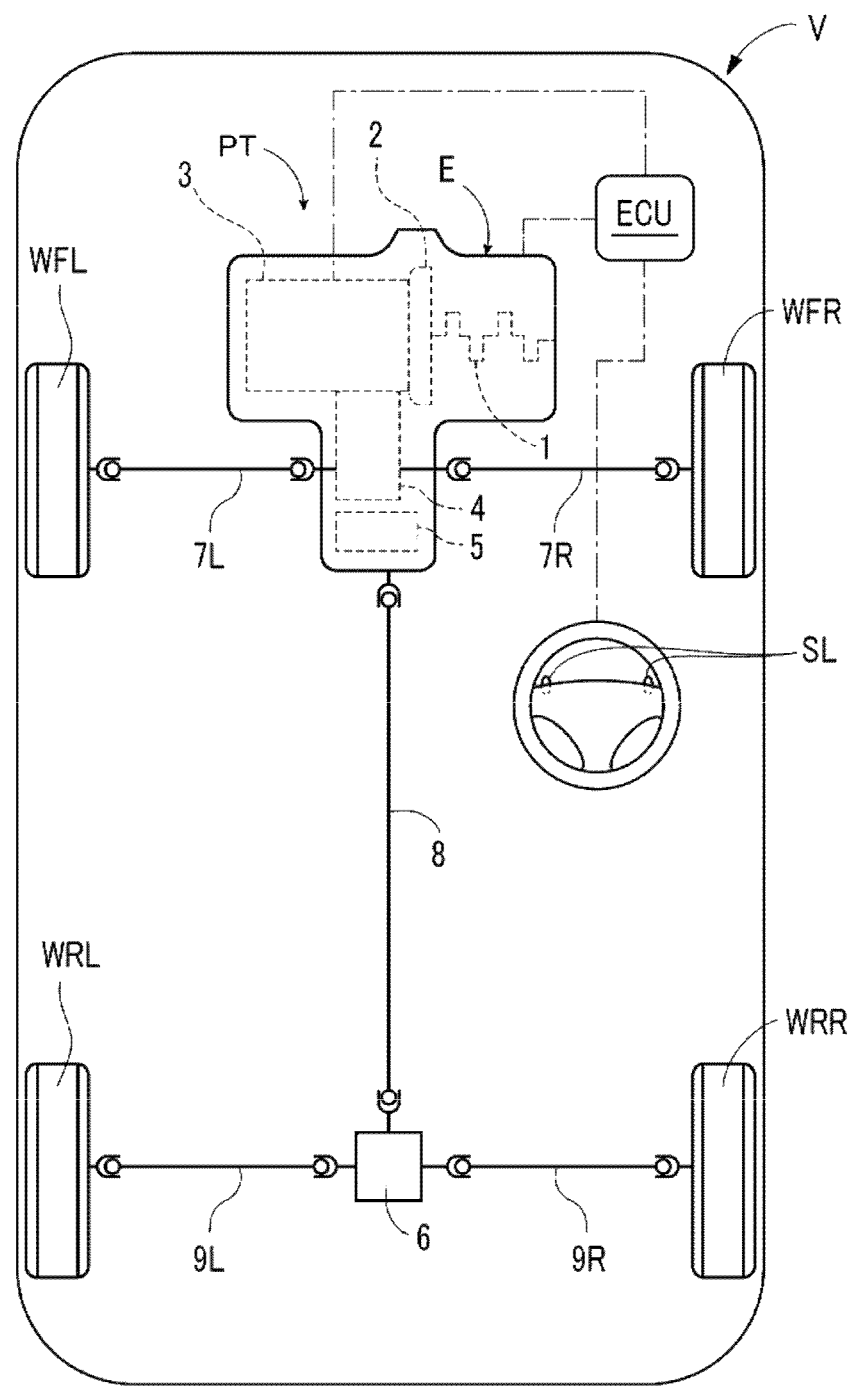
FIG. 1 is an explanatory view schematically illustrating a vehicle in which a transmission according to an embodiment is mounted.

As illustrated in FIG. 1, an engine E (internal combustion engine or driving source) is transversely mounted in a vehicle body so that a crankshaft 1 is directed in a leftward/rightward direction of the vehicle body of a vehicle V. A driving force of the engine E is transmitted to a left front wheel WFL, a right front wheel WFR, a left rear wheel WRL and a right rear wheel WRR through a power transmission device PT.

The power transmission device PT includes a torque converter 2 connected to the crankshaft 1, a transmission 3 (automatic transmission) connected to the torque converter 2, a front differential gear 4 connected to the transmission 3, a transfer device 5 connected to the front differential gear 4, and a rear differential gear 6 connected to the transfer device 5.

The front differential gear 4 is connected to the left front wheel WFL and the right front wheel WFR via a front left axle 7L and a front right axle 7R. The rear differential gear 6 is connected to the transfer device 5 via a propeller shaft 8 and is connected to the left rear wheel WRL and the right rear wheel WRR via a rear left axle 9L and a rear right axle 9R.

Figure 2:
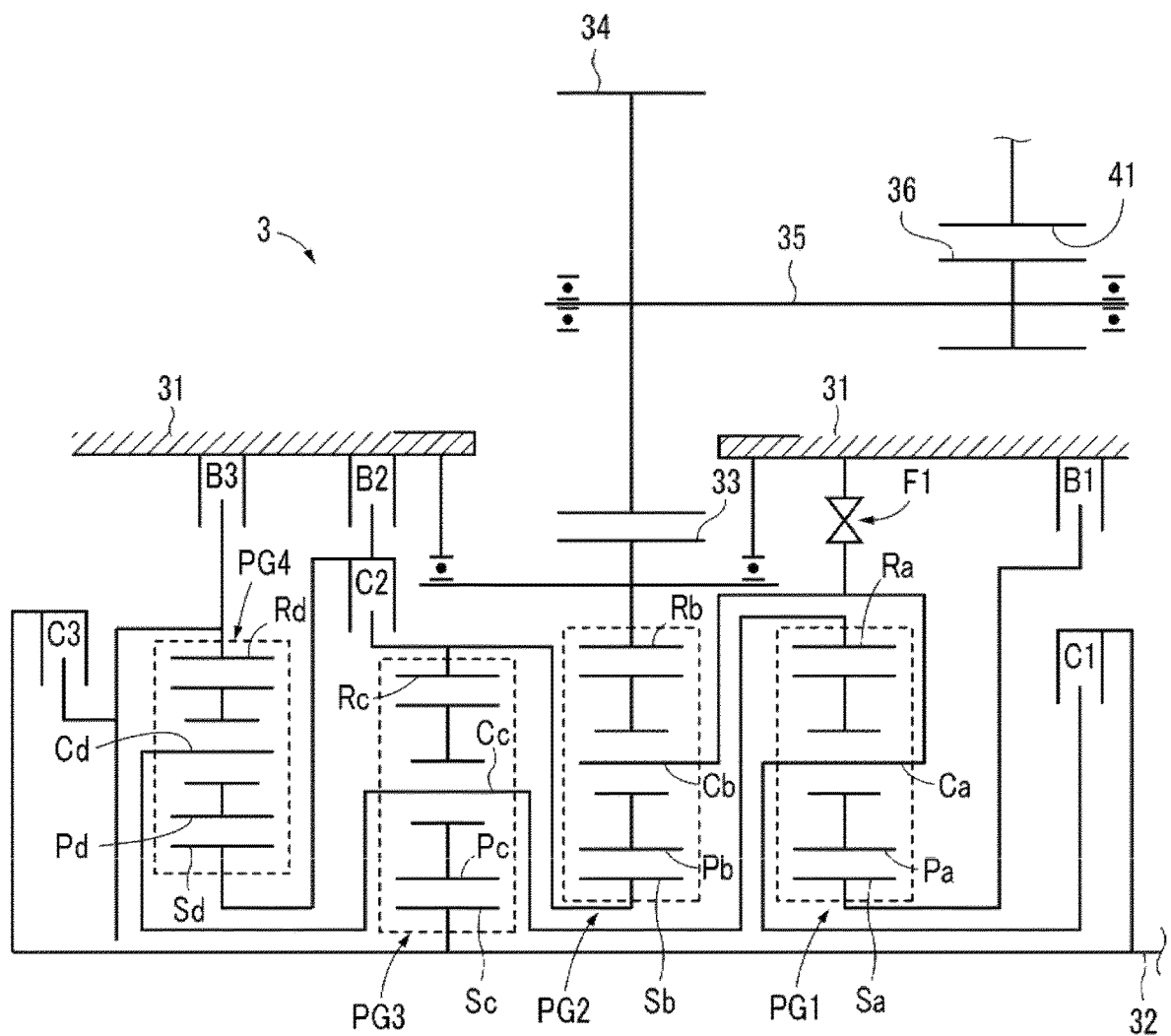
FIG. 2 is a skeleton diagram illustrating the transmission mounted in the vehicle of FIG. 1.

As illustrated in a skeleton diagram of FIG. 2, the transmission 3 includes an input shaft (input member) 32 pivotally supported inside a transmission case 31 (casing) to be rotatable, and an output member 33 configured as an output gear disposed concentrically with the input shaft 32.

The driving force output from the engine E is transmitted to the input shaft 32 via the torque converter 2 having a lock-up clutch and a damper.

Rotation of the output member 33 is transmitted to the left front wheel WFL and the right front wheel WFR (refer to FIG. 1) via an idle gear 34 engaged with the output member 33, an idle shaft 35 which pivotally supports the idle gear 34, a final drive gear 36 pivotally supported by the idle shaft 35, and a final driven gear 41 (that is, the front differential gear 4) engaged with the final drive gear 36.

Further, in the power transmission device PT, a single plate type or multiple plate type starting clutch configured to be frictionally engageable may be provided in place of the torque converter 2.

In an inside of the transmission case 31, a first planetary gear mechanism PG1, a second planetary gear mechanism PG2, a third planetary gear mechanism PG3, and a fourth planetary gear mechanism PG4 are disposed concentrically with the input shaft 32 in this order from the engine E side.

The third planetary gear mechanism PG3 is configured as a so-called single pinion type planetary gear mechanism including a sun gear Sc, a ring gear Rc, and a carrier Cc as elements, wherein the carrier Cc pivotally supports a pinion Pc in rotation and revolution, and the pinion Pc is engaged with the sun gear Sc and the ring gear Rc.

In a so-called single pinion type planetary gear mechanism, when the carrier is fixed and the sun gear is rotated, the ring gear rotates in a direction different from that of the sun gear, and thus the so-called single pinion type planetary gear mechanism is also referred to as a minus planetary gear mechanism or a negative planetary gear mechanism. Also, in the so-called single pinion type planetary gear mechanism, when the ring gear is fixed and the sun gear is rotated, the carrier rotates in the same direction as that of the sun gear.

Figure 3:
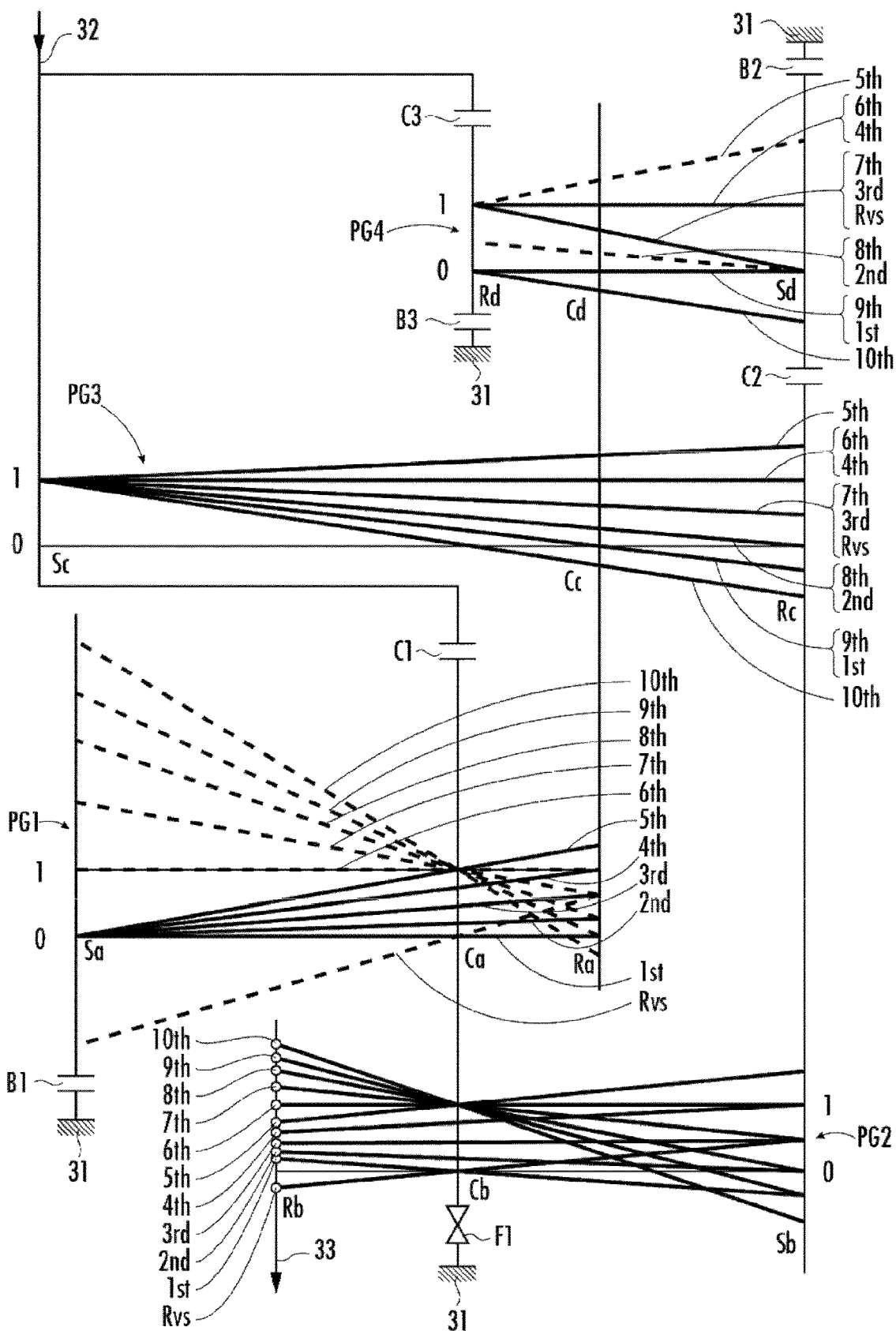
FIG. 3 is an alignment chart of a planetary gear mechanism of the transmission of FIG. 2.

An alignment chart (a diagram in which ratios between relative rotational speeds of three elements including the sun gear, the carrier and the ring gear can be expressed by a straight line (speed line)) illustrated in a second part from the top in FIG. 3 is an alignment chart of the third planetary gear mechanism PG3. As illustrated in the alignment chart, when it is assumed that the sun gear Sc, the carrier Cc and the ring gear Rc which are three elements of the third planetary gear mechanism PG3 are a first element, a second element and a third element from a left side in an arrangement order at intervals corresponding to a gear ratio (the number of teeth of the ring gear/the number of teeth of the sun gear) in the alignment chart, the first element is the sun gear Sc, the second element is the carrier Cc, and the third element is the ring gear Rc.

Here, a ratio between a distance from the sun gear Sc to the carrier Cc and a distance from the carrier Cc to the ring gear Rc is set to h:1, wherein h is the gear ratio of the third planetary gear mechanism PG3. Also, in the alignment chart, a lower horizontal line and an upper horizontal line (lines overlapping 4th and 6th) indicate that rotational speeds are "0" and "1" (the same rotational speed as that of the input shaft 32).

The fourth planetary gear mechanism PG4 is also configured as a so-called single pinion type planetary gear mechanism including a sun gear Sd, a ring gear Rd, and a carrier Cd as elements, wherein the carrier Cd pivotally supports a pinion Pd in rotation and revolution, and the pinion Pd is engaged with the sun gear Sd and the ring gear Rd.

An alignment chart illustrated in a first part (uppermost part) from the top in

FIG. 3 is an alignment chart of the fourth planetary gear mechanism PG4. As illustrated in the alignment chart, when it is assumed that the sun gear Sd, the carrier Cd and the ring gear Rd which are three elements of the fourth planetary gear mechanism PG4 are a fourth element, a fifth element and a sixth element from a left side in an arrangement order at intervals corresponding to a gear ratio in the alignment chart, the fourth element is the ring gear Rd, the fifth element is the carrier Cd, and the sixth element is the sun gear Sd.

Here, a ratio between a distance from the sun gear Sd to the carrier Cd and a distance from the carrier Cd to the ring gear Rd is set to i:1, wherein i is the gear ratio of the fourth planetary gear mechanism PG4.

The first planetary gear mechanism PG1 is also configured as a so-called single pinion type planetary gear mechanism including a sun gear Sa, a ring gear Ra, and a carrier Ca as elements, wherein the carrier Ca pivotally supports a pinion Pa in rotation and revolution, and the pinion Pa is engaged with the sun gear Sa and the ring gear Ra.

An alignment chart illustrated in a third part from the top in FIG. 3 is an alignment chart of the first planetary gear mechanism PG1. As illustrated in the alignment chart, when it is assumed that the sun gear Sa, the carrier Ca and the ring gear Ra which are three elements of the first planetary gear mechanism PG1 are a seventh element, an eighth element and a ninth element from a left side in an arrangement order at intervals corresponding to a gear ratio in the alignment chart, the seventh element is the sun gear Sa, the eighth element is the carrier Ca, and the ninth element is the ring gear Ra.

Here, a ratio of a distance from the sun gear Sa to the carrier Ca to a distance from the carrier Ca to the ring gear Ra is set to j:1, wherein j is the gear ratio of the first planetary gear mechanism PG1.

The second planetary gear mechanism PG2 is also configured as a so-called single pinion type planetary gear mechanism including a sun gear Sb, a ring gear Rb, and a carrier Cb as elements, wherein the carrier Cb pivotally supports a pinion Pb in rotation and revolution, and the pinion Pb is engaged with the sun gear Sb and the ring gear Rb.

An alignment chart illustrated in a fourth part (lowermost part) from the top in FIG. 3 is an alignment chart of the second planetary gear mechanism PG2. As illustrated in the alignment chart, when it is assumed that the sun gear Sb, the carrier Cb and the ring gear Rb which are three elements of the second planetary gear mechanism PG2 are a tenth element, an eleventh element and a twelfth element from a left side in an arrangement order at intervals corresponding to a gear ratio in the alignment chart, the tenth element is the ring gear Rb, the eleventh element is the carrier Cb, and the twelfth element is the sun gear Sb.

Here, a ratio of a distance from the sun gear Sb to the carrier Cb and a distance from the carrier Cb to the ring gear Rb is set to k:1, wherein k is the gear ratio of the second planetary gear mechanism PG2.

The sun gear Sc (first element) of the third planetary gear mechanism PG3 is connected to the input shaft 32. Further, the ring gear Rb (tenth element) of the second planetary gear mechanism PG2 is connected to the output member 33 configured as the output gear.

Also, the carrier Cc (second element) of the third planetary gear mechanism PG3, the carrier Cd (fifth element) of the fourth planetary gear mechanism PG4 and the ring gear Ra (ninth element) of the first planetary gear mechanism PG1 are connected to each other, and a first connected body Cc-Cd-Ra is formed.

Also, the ring gear Rc (third element) of the third planetary gear mechanism PG3 and the sun gear Sb (twelfth element) of the second planetary gear mechanism PG2 are connected to each other, and a second connected body Rc-Sb is formed.

Also, the carrier Ca (eighth element) of the first planetary gear mechanism PG1 and the carrier Cb (eleventh element) of the second planetary gear mechanism PG2 are connected to each other, and a third connected body Ca-Cb is formed.

Further, the transmission 3 has seven engagement mechanisms which includes three clutches which are a first clutch C1, a second clutch C2 and a third clutch C3, and three brakes which are a first brake B1, a second brake B2 and a third brake B3, and one two-way clutch F1.

The first clutch C1 is a hydraulically actuated wet multiple disk clutch. Due to the first clutch C1, the third planetary gear mechanism PG3 is configured to be switchable between a connected state in which the sun gear Sc (first element) and the third connected body Ca-Cb are connected and an open state in which the connection is disconnected.

The third clutch C3 is a hydraulically actuated wet multiple disk clutch. Due to the third clutch C3, the third planetary gear mechanism PG3 is configured to be switchable between a connected state in which the sun gear Sc (first element) and the ring gear Rd (fourth element) of the fourth planetary gear mechanism PG4 are connected and an open state in which the connection is disconnected.

The second clutch C2 is a hydraulically actuated wet multiple disk clutch. Due to the second clutch C2, the fourth planetary gear mechanism PG4 is configured to be switchable between a connected state in which the sun gear Sd (sixth element) and the second connected body Rc-Sb are connected and an open state in which the connection is disconnected.

The two-way clutch F1 also serves as a fourth brake. The two-way clutch F1 is configured to be switchable between a reverse rotation prevention state in which normal rotation (rotation in the same direction as a rotation direction of the input shaft 32 and the output member 33) of the third connected body Ca-Cb is allowed and reverse rotation is prevented and a fixed state in which the third connected body Ca-Cb is fixed to the transmission case 31.

In the reverse rotation prevention state, when a force intended to cause rotation in a normal rotation direction is applied to the third connected body Ca-Cb, rotation is allowed, and the two-way clutch F1 is brought into the open state. On the other hand, when a force intended to cause rotation in a reverse rotation direction is applied, rotation is blocked, and the two-way clutch F1 is brought into the fixed state in which the third connected body Ca-Cb is fixed to the transmission case 31.

The first brake B1 is a hydraulically actuated wet multiple disk brake. Due to the first brake B1, the first planetary gear mechanism PG1 is configured to be switchable between a fixed state in which the sun gear Sa (seventh element) is fixed to the transmission case 31 and an open state in which the fixed state is released.

The second brake B2 is a hydraulically actuated wet multiple disk brake. Due to the second brake B2, the fourth planetary gear mechanism PG4 is configured to be switchable between a fixed state in which the sun gear Sd (sixth element) is fixed to the transmission case 31 and an open state in which the fixed state is released.

The third brake B3 is a hydraulically actuated wet multiple disk brake. Due to the third brake B3, the fourth planetary gear mechanism PG4 is configured to be switchable between a fixed state in which the ring gear Rd (fourth element) is fixed to the transmission case 31 and an open state in which the fixed state is released.

The switching of the three clutches which are the first clutch C1, the second clutch C2 and the third clutch C3, the three brakes which are the first brake B 1, the second brake B2 and the third brake B3, and one two-way clutch F1 is controlled by a control part ECU (refer to FIG. 1) including a transmission control unit (TCU) on the basis of vehicle information such as a traveling speed of the vehicle V transmitted from an integrated control unit which is not illustrated.

The control part ECU is configured as an electronic unit composed of a CPU, a memory or the like which is not illustrated. The control part ECU receives predetermined vehicle information such as a traveling speed of the vehicle V or an opening degree of an accelerator, a rotational speed or an output torque of the engine E, operation information of a paddle shift lever, and so on and controls the transmission 3 by executing a control program held in a storage device such as a memory with a CPU.

In the transmission 3, the first clutch C1, the first planetary gear mechanism PG1, the second planetary gear mechanism PG2, the third planetary gear mechanism PG3, the second clutch C2, the fourth planetary gear mechanism PG4 and the third clutch C3 are disposed on an axial line of the input shaft 32 in this order from the engine E and torque converter 2 side.

Additionally, the third brake B3 is disposed radially outward of the fourth planetary gear mechanism PG4, the second brake B2 is disposed radially outward of the second clutch C2, the first brake B1 is disposed radially outward of the first clutch C1, and the two-way clutch F1 is disposed radially outward of the first planetary gear mechanism PG1.

Accordingly, in the transmission 3, the first brake B1, the second brake B2, the third brake B3 and the two-way clutch F1 are disposed radially outward of the planetary gear mechanism or the clutch. Therefore, an axial length of the transmission 3 is shortened as compared with the case in which the first brake B1, the second brake B2, the third brake B3 and the two-way clutch F1 are disposed parallel to each other together with the planetary gear mechanism on the axial line of the input shaft 32.

Further, even if the third brake B3 is disposed radially outward of the third clutch C3 and the second brake B2 is disposed radially outward of the fourth planetary gear mechanism PG4, it is also possible to shorten the axial length.

Next, a case in which each gear shift stage of the transmission 3 of the embodiment is established will be described with reference to FIG. 3 and FIG. 4.

Further, a speed line indicated by a broken line in FIG. 3 indicates that elements of other planetary gear mechanisms rotate (idle) by following a planetary gear mechanism which transmits power among the first planetary gear mechanism PG1, the second planetary gear mechanism PG2, the third planetary gear mechanism PG3 and the fourth planetary gear mechanism PG4.

Figures 4, 5:
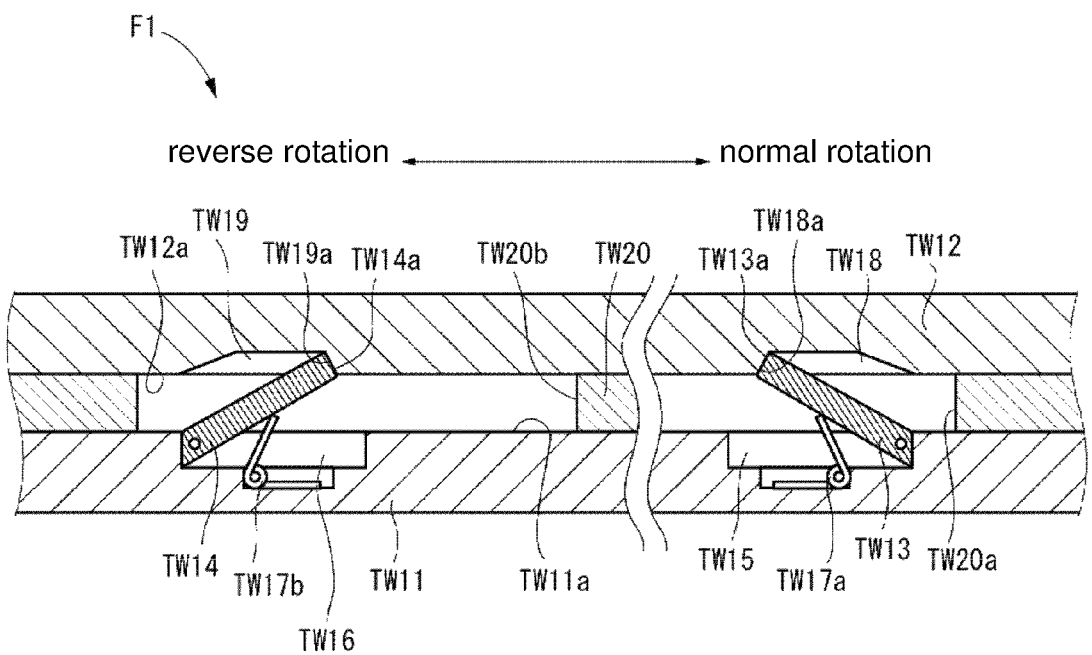
FIG. 4 is an explanatory view illustrating an engagement state of each engagement mechanism in each gear shift stage of the transmission of FIG. 2.
FIG. 5 is a cross-sectional view illustrating a fixed state of a two-way clutch of the transmission of FIG. 2.

FIG. 4 is a diagram collectively illustrating states of the three clutches which are the first clutch Cl, the second clutch C2 and the third clutch C3, the three brakes which are the first brake B1, the second brake B2 and the third brake B3, and one two-way clutch F1 in each gear shift stage which will be described later.

In this drawing, "O" in a row of each of the first clutch C1, the second clutch C2, the third clutch C3, the first brake B1, the second brake B2 and the third brake B3 indicates a connected state or a fixed state, and a blank indicates an open state. Also, "R" in a row of the two-way clutch F1 indicates a reverse rotation prevention state, and "L" indicates a fixed state.

Further, underlined "R" and "L" indicate that the rotational speed of the third connected body Ca-Cb becomes "0" due to an action of the two-way clutch F1. Also, "R/L" indicates a state that is a reverse rotation prevention state "R" normally but switched to a fixed state "L" when an engine brake is applied.

Further, FIG. 4 indicates a gear shift ratio (rotational speed of the input shaft 32/rotational speed of the output member 33) in each gear shift stage and a common ratio (a ratio of gear ratios between gear shift stages; a value obtained by dividing a gear shift ratio of a predetermined gear shift stage by a gear shift ratio of a gear shift stage that is one gear shift stage higher than the predetermined gear shift stage) in the case in which the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. Accordingly, it can be understood that common ratio can be appropriately set.

When a first gear stage is established, the two-way clutch F1 is set to be in the reverse rotation prevention state (R in FIG. 4), and the first brake B1 and the second brake B2 are set to be in the fixed state.

By setting the two-way clutch F1 to be in the reverse rotation prevention state R and setting the first brake B1 to be in the fixed state, reverse rotation of the third connected body Ca-Cb and the sun gear Sa (seventh element) of the first planetary gear mechanism PG1 is prevented, and the rotational speed of the third connected body Ca-Cb and the sun gear Sa (seventh element) of the first planetary gear mechanism PG1 becomes "0".

Accordingly, the sun gear Sa (seventh element), the carrier Ca (eighth element), and the ring gear Ra (ninth element) of the first planetary gear mechanism PG1 are brought into a locked state in which relative rotation is not possible, and the rotational speed of the first connected body Cc-Cd-Ra including the ring gear Ra (ninth element) of the first planetary gear mechanism PG1 also becomes "0".

Then, the rotational speed of the ring gear Rb (tenth element) of the second planetary gear mechanism PG2 to which the output member 33 is connected becomes "1st" illustrated in FIG. 3, and the first gear stage is established.

Also, in order to establish the first gear stage, it is not necessary to set the second brake B2 in the fixed state. However, to smoothly shift from the first gear stage to a second gear stage which will be described later, the second brake B2 is fixed in the first gear stage. Further, when the engine brake is applied at the first gear stage, the two-way clutch F1 may be switched from the reverse rotation prevention state R to the fixed state L.

When the second gear stage is established, the two-way clutch F1 is set to be in the reverse rotation prevention state R, the first brake B1 and the second brake B2 are set to be in the fixed state, and the second clutch C2 is set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the second clutch C2 to be in the connected state, the rotational speed of the second connected body Rc-Sb becomes "0" which is the same speed as the rotational speed of the sun gear Sd (sixth element) of the fourth planetary gear mechanism PG4.

Then, the rotational speed of the ring gear Rb (tenth element) of the second planetary gear mechanism PG2 to which the output member 33 is connected becomes "2nd" illustrated in FIG. 3, and the second gear stage is established.

When a third gear stage is established, the two-way clutch F1 is set to be in the reverse rotation prevention state, the first brake B1 and the second brake B2 are set to be in the fixed state, and the third clutch C3 is set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3 connected to the input shaft 32.

Accordingly, since the rotational speed of the sun gear Sd (sixth element) of the fourth planetary gear mechanism PG4 becomes "0" and the rotational speed of the ring gear Rd (fourth element) becomes "1", the rotational speed of the carrier Cd (fifth element), that is, the rotational speed of the first connected body Ccl-Cd-Ra becomes $i/(i+1)$.

Additionally, the rotational speed of the ring gear Rb (tenth element) of the second planetary gear mechanism PG2 to which the output member 33 is connected becomes "3rd" illustrated in FIG. 3, and the third gear stage is established.

When a fourth gear stage is established, the two-way clutch F1 is set to be in the reverse rotation prevention state, the first brake B1 is set to be in the fixed state, and the second clutch C2 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the second clutch C2 to be in the connected state, the sun gear Sd (sixth element) of the fourth planetary gear mechanism PG4 and the second connected body Re-Sb rotate at the same speed. Therefore, between the third planetary gear mechanism PG3 and the fourth planetary gear mechanism PG4, the carrier Cc (second element) and the carrier Cd (fifth element) are connected, and the ring gear Rc (third element) and the sun gear Sd (sixth element) are connected. Therefore, in the fourth gear stage in which the second clutch C2 is in the connected state, one alignment chart including four elements formed by the third planetary gear mechanism PG3 and the fourth planetary gear mechanism PG4 can be drawn.

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speeds of two elements among the four elements formed by the third planetary gear mechanism PG3 and the fourth planetary gear mechanism PG4 become the same speed of "1".

Accordingly, each of the elements of the third planetary gear mechanism PG3 and the fourth planetary gear mechanism PG4 is in the locked state in which relative rotation is not possible, and the rotational speeds of all the elements of the third planetary gear mechanism PG3 and the fourth planetary gear mechanism PG4 become "1" Further, the rotational speed of the third connected body Ca-Cb becomes $j/(j+1)$.

Additionally, the rotational speed of the ring gear Rb (tenth element) of the second planetary gear mechanism PG2 to which the output member 33 is connected becomes "4th" illustrated in FIG. 3, and the fourth gear stage is established.

When a fifth gear stage is established, the two-way clutch F1 is set to be in the reverse rotation prevention state, the first brake B1 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the first clutch Cl to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "5th" illustrated in FIG. 3, and the fifth gear stage is established.

Also, to establish the fifth gear stage, it is not necessary to set the third clutch C3 to be in the connected state. However, in the fourth gear stage and a sixth gear stage which will be described later, it is necessary to set the third clutch C3 in the connected state, and thus the fifth gear stage is also set to be in the connected state such that downshifting from the fifth gear stage to the fourth gear stage and upshifting from the fifth gear stage to the sixth gear stage which will be described later can be performed smoothly.

When the sixth gear stage is established, the two-way clutch F1 is set to be in the reverse rotation prevention state, and the first clutch C1, the second clutch C2 and the third clutch C3 are set to be in the connected state.

By setting the two-way clutch F1 to be in the reverse rotation prevention state, normal rotation of the third connected body Ca-Cb is allowed.

Further, by setting the second clutch C2 and the third clutch C3 to be in the connected state, each of the elements of the third planetary gear mechanism PG3 and the fourth planetary gear mechanism PG4 is in a state in which relative rotation is not possible, and the rotational speed of the second connected body Rc-Sb becomes "1" as described for the fourth gear stage. Furthermore, by setting the first clutch C1 to be in the connected state, the rotational speed of the third connected body Ca-Cb becomes "1".

As a result, the rotational speeds of the carrier Cb (eleventh element) and the sun gear SU (twelfth element) of the second planetary gear mechanism PG2 become the same speed of "1", and each of the elements is in the locked state in which relative rotation is not possible.

Additionally, the rotational speed of the ring gear Rb (tenth element) of the second planetary gear mechanism PG2 to which the output member 33 is connected becomes "1" of "6th" illustrated in FIG. 3, and the sixth gear stage is established.

When a seventh gear stage is established, the two-way clutch F1 is set to be in the reverse rotation prevention state, the second brake B2 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speed of the first connected body Cc1-Cd-Ra including the carrier Cd (fifth element) of the fourth planetary gear mechanism PG4 becomes $i/(i+1)$. Further, by setting the first clutch C1 to be in the connected state, the rotational speed of the third connected body Ca-Cb becomes "1" which is the same speed as the rotational speed of the sun gear Sc (first element) of the third planetary gear mechanism PG3 connected to the input shaft 32.

Additionally, the rotational speed of the ring gear Rb (tenth element) of the second planetary gear mechanism PG2 to which the output member 33 is connected becomes "7th" illustrated in FIG. 3, and the seventh gear stage is established.

When an eighth gear stage is established, the two-way clutch F1 is set to be in the reverse rotation prevention state, the second brake B2 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Further, by setting the second clutch C2 to be in the connected state, the rotational speed of the second connected body Re-Sb becomes "0" which is the same speed as the rotational speed of the sun gear Sd (sixth element) of the fourth planetary gear mechanism PG 4. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "8th" illustrated in FIG. 3, and the eighth gear stage is established.

When a ninth gear stage is established, the two-way clutch F1 is set to be in the reverse rotation prevention state, the second brake B2 and the third brake B3 are set to be in the fixed state, and the first clutch C1 is set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0". Also, by setting the third brake B3 to be in the fixed state, the rotational speed of the ring gear Rd (fourth element) of the fourth planetary gear mechanism PG4 also becomes "0".

Accordingly, the sun gear Sd (sixth element), the carrier Cd (fifth element), and the ring gear Rd (fourth element) of the fourth planetary gear mechanism PG4 are in the locked state in which relative rotation is not possible, and the rotational speed of the first connected body Cc-Cd-Ra including the carrier Cd (fifth element) of the fourth planetary gear mechanism PG4 also becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "9th" illustrated in FIG. 3, and the ninth gear stage is established.

When a tenth gear stage is established, the two-way clutch F1 is set to be in the reverse rotation prevention state R, the third brake B3 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Also, by setting the third brake B3 to be in the fixed state, the rotational speed of the ring gear Rd (fourth element) of the fourth planetary gear mechanism PG4 becomes "0".

Further, by setting the second clutch C2 to be in the connected state, the second connected body Rc-Sb and the sun gear Sd (sixth element) of the fourth planetary gear mechanism PG4 rotate at the same speed. Also, by setting the first clutch Cl to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 33 is connected becomes "10th" illustrated in FIG. 3, and the tenth gear stage is established.

When a reverse gear stage is established, the two-way clutch F1 is set to be in the fixed state (L in FIG. 4), the second brake B2 is set to be in the fixed state, and the third clutch C3 is set to be in the connected state.

By setting the second brake B2 to be in the fixed state and setting the third clutch C3 to be connected state, the rotational speed of the first connected body Cc-Cd-Ra becomes i/(i+1). Further, by setting the two-way clutch F1 to be in the fixed state, the rotational speed of the third connected body Ca-Cb becomes "0".

Additionally, the rotational speed of the ring gear Rb (tenth element) of the second planetary gear mechanism PG2 to which the output member 33 is connected becomes "Rvs" of the reverse rotation illustrated in FIG. 3, and the reverse gear stage is established.

Next, the two-way clutch F1 will be described in detail with reference to FIGS. 5 to 8.

The two-way clutch F1 is configured to be switchable between the fixed state in which the third connected body Ca-Cb is fixed to the transmission case 31 and the reverse rotation prevention state in which normal rotation of the third connected body Ca-Cb is allowed and reverse rotation thereof is prevented.

Figure 6:
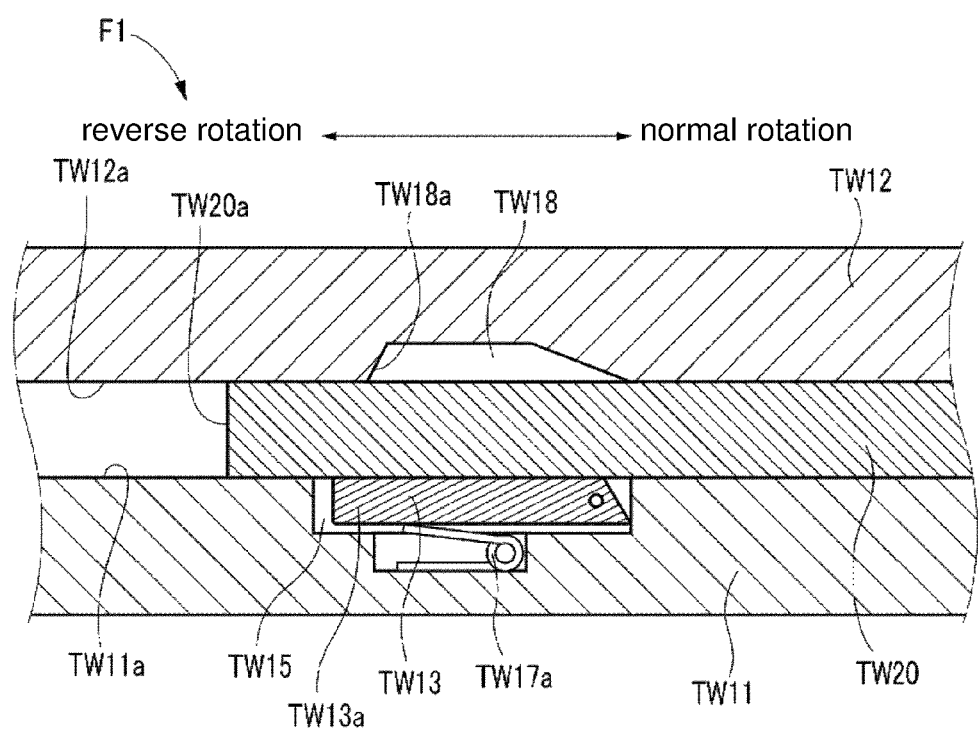
FIG. 6 is a cross-sectional view illustrating a reverse rotation prevention state of a main part of the two-way clutch of the transmission of FIG. 2.

As illustrated in cross-sections in FIGS. 5 and 6, the two-way clutch F1 includes a fixed plate TW11 (first member) fixed to the transmission case 31 and a rotating plate TW12 (second member).

Figure 7:
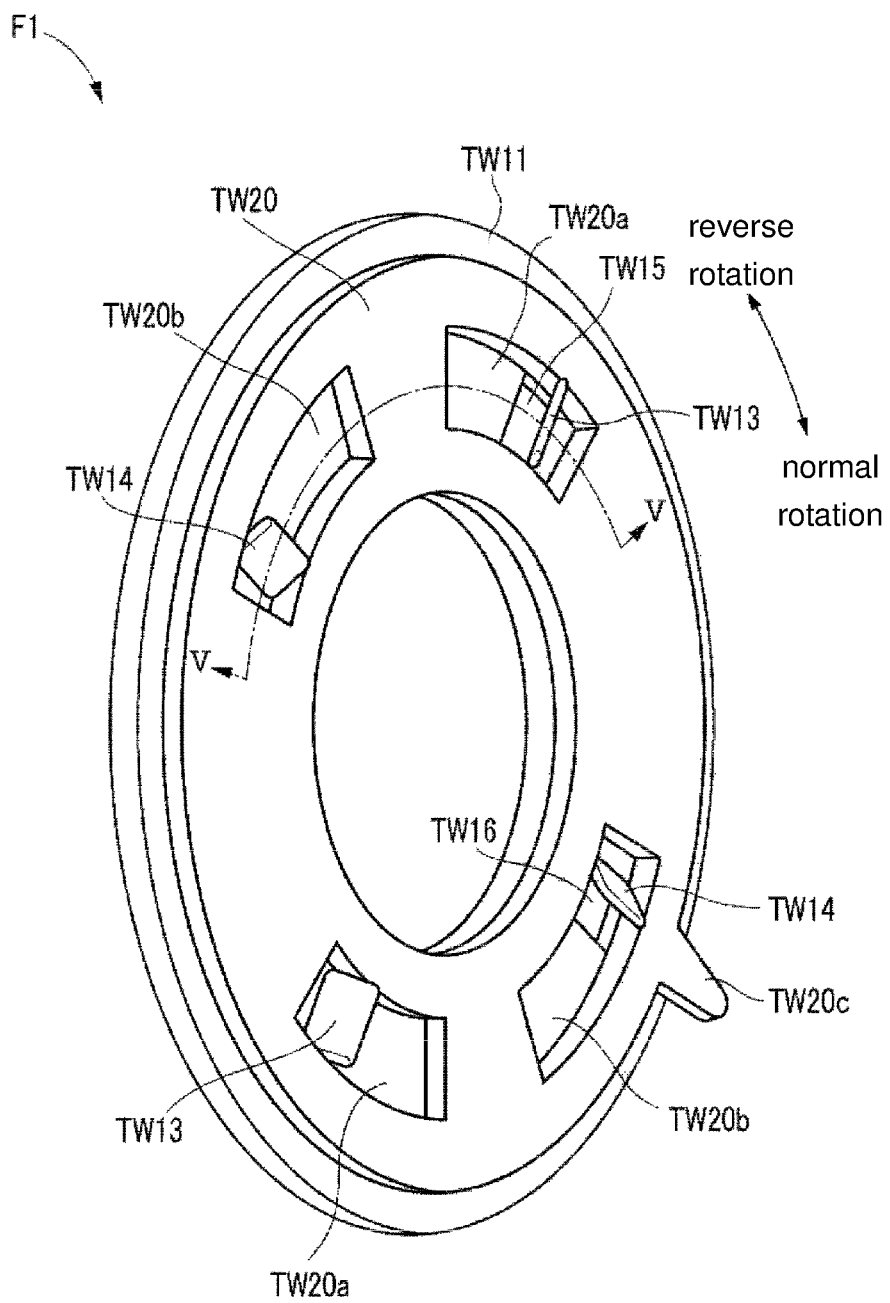
FIG. 7 is a perspective view illustrating the fixed state of the two-way clutch of the transmission of FIG. 2.

As illustrated in FIG. 7, the fixed plate TW11 is formed to have an annular shape (donut shape). Further, although not illustrated in FIG. 7, like the fixed plate TW11, the rotating plate TW12 is formed to have an annular shape (donut shape), and the fixed plate TW11 and the rotating plate TW12 are concentrically arranged.

As illustrated in FIG. 5, on a first facing surface TW11a of the fixed plate TW11 which faces the rotating plate TW12, there are provided a plate-shaped normal rotation prevention side swinging portion TW13 (switching member) and a plate-shaped reverse rotation prevention side swinging portion TW14.

The normal rotation prevention side swinging portion TW13 is installed on the fixed plate TW11 so that a first end TW13a on the other side of the fixed plate TW11 (direction in which the rotating plate TW12 rotates in a reverse direction) in a circumferential direction may be swung around an end on one side thereof (direction in which the rotating plate TW12 rotates in a normal direction) in the circumferential direction.

The reverse rotation prevention side swinging portion TW14 is installed on the fixed plate TW11 so that a second end TW14a on the other side of the fixed plate TW11 (normal rotation direction) in the circumferential direction may be swung around an end on one side thereof (reverse rotation direction) in the circumferential direction.

Further, a first accommodating portion TW15 recessed to accommodate the normal rotation prevention side swinging portion TW13 and a second accommodating portion TW16 recessed to accommodate the reverse rotation prevention side swinging portion TW14 are provided on the first facing surface TW11a of the fixed plate TW11.

A first biasing member TW17a configured with a spring which biases the normal rotation prevention side swinging portion TW13 is provided on a bottom surface of the first accommodating portion TW15 so that the swinging first end TW13a of the normal rotation prevention side swinging portion TW13 protrudes from the first accommodating portion TW15.

A second biasing member TW17b configured with a spring which biases the reverse rotation prevention side swinging portion TW14 is provided on a bottom surface of the second accommodating portion TW16 so that the swinging second end TW14a of the reverse rotation prevention side swinging portion TW14 protrudes from the second accommodating portion TW16.

In a second facing surface TW12a facing the fixed plate TW11 of the rotating plate TW12, a first hole TW18 is provided at a position corresponding to the normal rotation prevention side swinging portion TW13, and a second hole TW19 is provided at a position corresponding to the reverse rotation prevention side swinging portion TW14.

A stepped first engaging portion TW18a which is located on the other side of the rotating plate TW12 (reverse rotation direction) in the circumferential direction and is capable of engaging with the swinging first end TW13a of the normal rotation prevention side swinging portion TW13 is provided in the first hole TW18 provided at a position corresponding to the normal rotation prevention side swinging portion TW13.

A stepped second engaging portion TW19a which is located on one side of the rotating plate TW12 (normal rotation direction) in the circumferential direction and is capable of engaging with the swinging second end TW14a of the reverse rotation prevention side swinging portion TW14 is provided in the second hole TW19 provided at a position corresponding to the reverse rotation prevention side swinging portion TW14.

As illustrated in FIGS. 5 and 7, when the first end TW13a of the normal rotation prevention side swinging portion TW13 and the first engaging portion TW18a are engageable with each other, and also when the second end TW14a of the reverse rotation prevention side swinging portion TW14 and the second engaging portion TW19a are engageable with each other, the rotating plate TW12 is prevented from rotating in both the normal and reverse directions. Therefore, a state in which the first end TW13a and the second end TW14a, and the first engaging portion TW18a and the second engaging portion TW19a corresponding thereto are engaged with each other is the fixed state in the two-way clutch F1.

A switching plate TW20 is interposed between the fixed plate TW11 and the rotating plate TW12. The switching plate TW20 is also formed to have an annular shape (donut shape). In the switching plate TW20, a first notch hole TW20a and a second notch hole TW20b are formed at positions corresponding to the normal rotation prevention side swinging portion TW13 and the reverse rotation prevention side swinging portion TW14. A protruding portion TW20c protruding radially outward is provided at an outer edge of the switching plate TW20.

Figure 8:
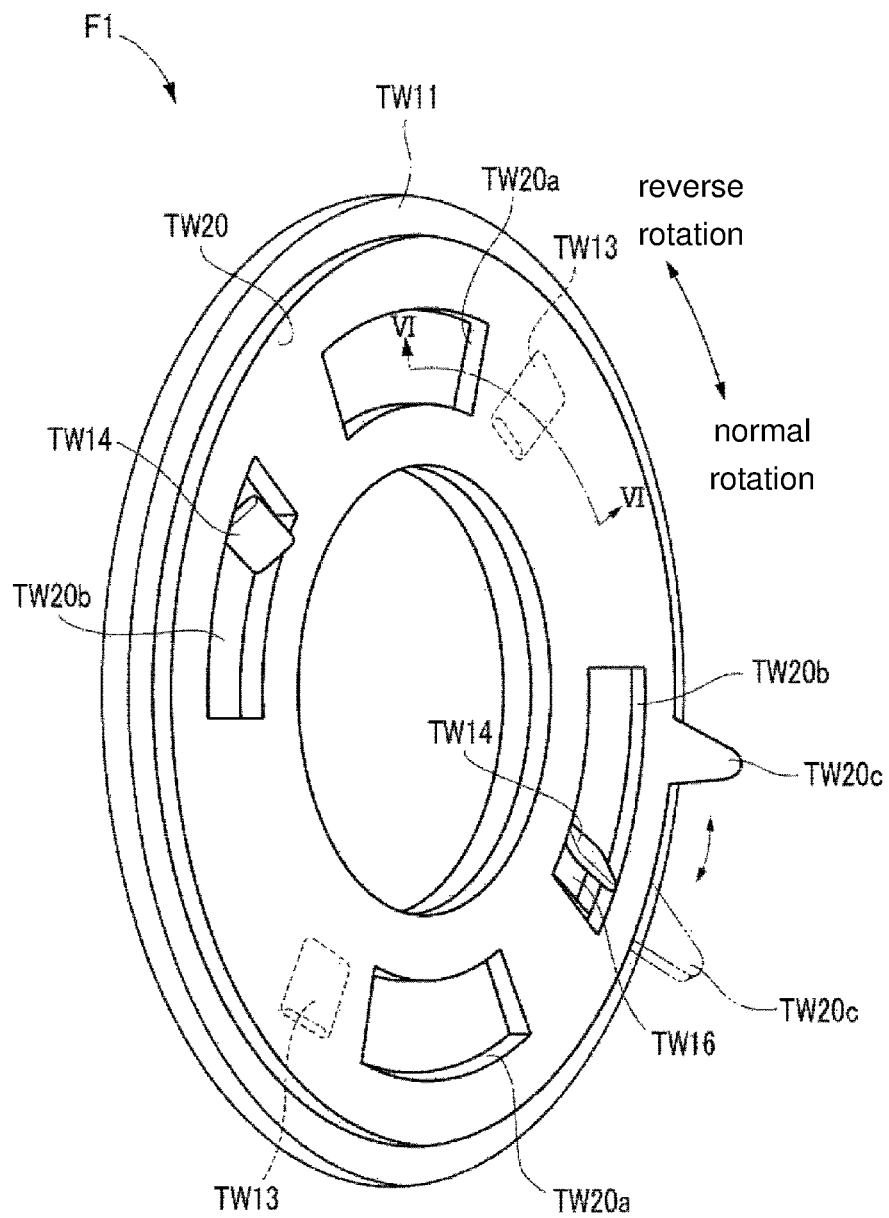
FIG. 8 is a perspective view illustrating the reverse rotation prevention state of the two-way clutch of the transmission of FIG. 2.

As illustrated in FIG. 8, the switching plate TW20 is formed to be rotatable with respect to the fixed plate TW11.

When the switching plate TW20 is swung from the fixed state illustrated in FIG. 7 to a state illustrated in FIG. 8, the first notch hole TW20a corresponding to the normal rotation prevention side swinging portion TW13 moves over the normal rotation prevention side swinging portion TW13, as illustrated in FIG. 6. Additionally, the normal rotation prevention side swinging portion TW13 is pushed by the switching plate TW20 and accommodated in the first accommodating portion TW15 against a pressing force of the first biasing member TW17a.

Therefore, the engagement between the first end TW13a of the normal rotation prevention side swinging portion TW13 and the first engaging portion TW18a is blocked, and rotation of the rotating plate TW12 on the normal rotation side is allowed.

Further, as illustrated in FIG. 8, the second notch hole TW20b corresponding to the reverse rotation prevention side swinging portion TW14 is configured so that the reverse rotation prevention side swinging portion TW14 is not accommodated in the second accommodating portion TW16 and the second end TW14a may be engaged with the second engaging portion TW19a even when the switching plate TW20 is swung from the fixed state illustrated in FIG. 7 to the state illustrated in FIG. 8.

From these facts, the states illustrated in FIGS. 6 and 8 are the reverse rotation prevention state in the two-way clutch F1.

Next, a switching control mechanism for switching the two-way clutch F1 will be described with reference to FIGS. 9A and 9B.

Figure 9A:
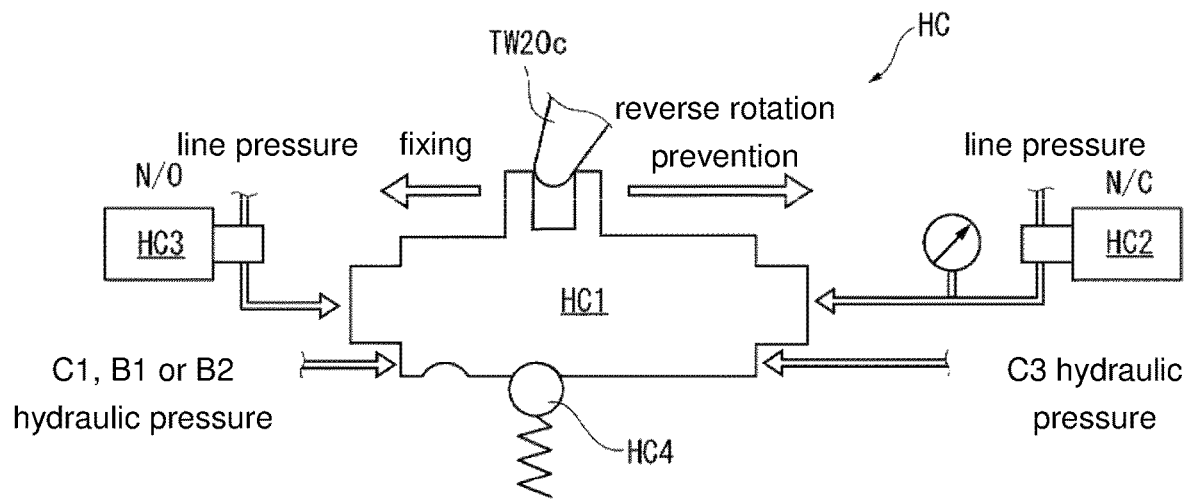
Figure 9B:
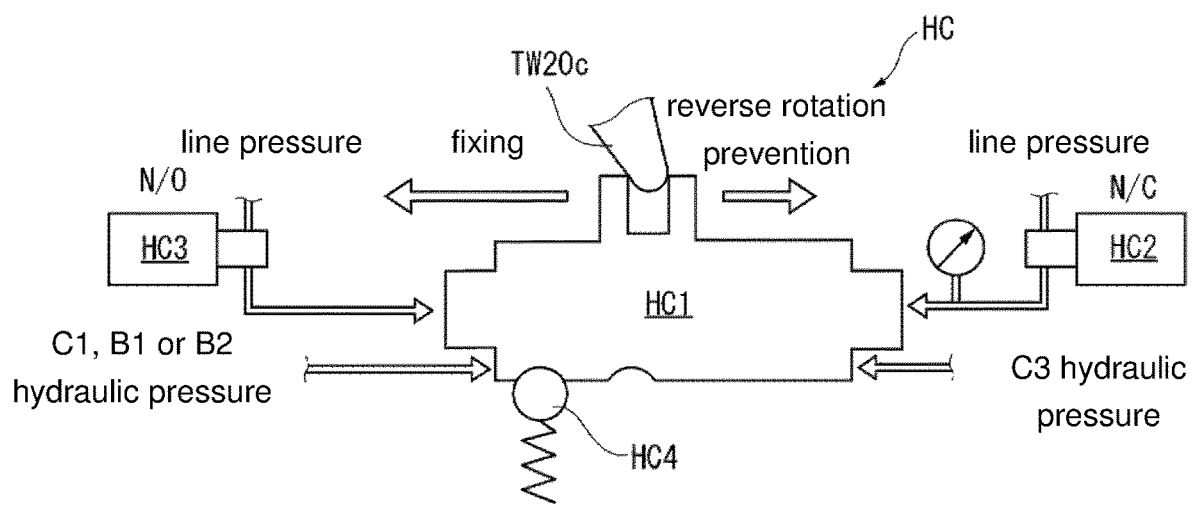

As illustrated in FIGS. 9A and 9B, a hydraulic control circuit HC (lubricating fluid supply mechanism) provided in the transmission 3 includes a piston HC1 engaged with the protruding portion TW20c provided on the switching plate TW20. The two-way clutch F1 is switched to the fixed state when the piston HC1 moves to a predetermined position (position illustrated in FIG. 9A) on the left side illustrated in FIG. 9A and is switched to the reverse rotation prevention state when the piston HC1 moves to a predetermined position (position illustrated in FIG. 9B) on the right side as illustrated in FIG. 9B.

A right side of the piston HC1 in the drawing is configured so that a line pressure may be supplied via a first on-off valve HC2 comprised of a solenoid valve. A left side of the piston HC1 in the drawing is configured so that a line pressure may be supplied via a second on-off valve HC3 composed of a solenoid valve. The first on-off valve HC2 is a normally closed type, and the second on-off valve HC3 is of a normally open type.

The first on-off valve HC2 and the second on-off valve HC3 are opened and closed according to a signal from the control part ECU. That is, the two-way clutch F1 is controlled by the control part ECU via the hydraulic control circuit HC.

Further, on the right side of the piston HC1 in the drawing, a hydraulic pressure (fluid pressure) supplied to the third clutch C3 is supplied to a position on a surface different from the surface receiving the line pressure. On the left side of the piston HC1 in the drawing, a hydraulic pressure supplied to the first clutch C1, the first brake B1 or the second brake B2 is supplied to a position on a surface different from the surface receiving the line pressure. The hydraulic pressure of the first clutch C1, the first brake B1 or the second brake B2, and the third clutch C3 which is supplied to the piston HC1 is used as a RVS preparation pressure.

Further, a detent mechanism HC4 is provided at the piston HC1, and the fixed state illustrated in of FIG. 9A and the reverse rotation prevention state illustrated in FIG. 9B are not switched when the line pressure does not exceed a predetermined value.

According to the hydraulic control circuit HC, by setting the first on-off valve HC2 to be in an open state, setting the second, on-off valve HC3 to be in a closed state and thus setting the line pressure to be equal to or higher than a predetermined switching hydraulic pressure set on the basis of a pressure difference between the hydraulic pressure of the first clutch C1, the first brake B1, or the second brake B2 and the hydraulic pressure of the third clutch C3 and a load due to the detent mechanism HC4, the piston HC1 moves to the left side in the drawing, and the two-way clutch F1 is switched to the fixed state.

Conversely, by setting the first on-off valve HC2 to be in the closed state, setting the second on-off valve HC3 to be in the open state and thus setting the line pressure to be equal to or higher than the above-mentioned predetermined switching hydraulic pressure, the piston HC1 moves to the right side in the drawing, and the two-way clutch F1 switches to the reverse rotation prevention state.

Next, signals acquired by various sensors and the control part ECU mounted in the vehicle V will be described with reference to FIG. 10.

Figure 10:
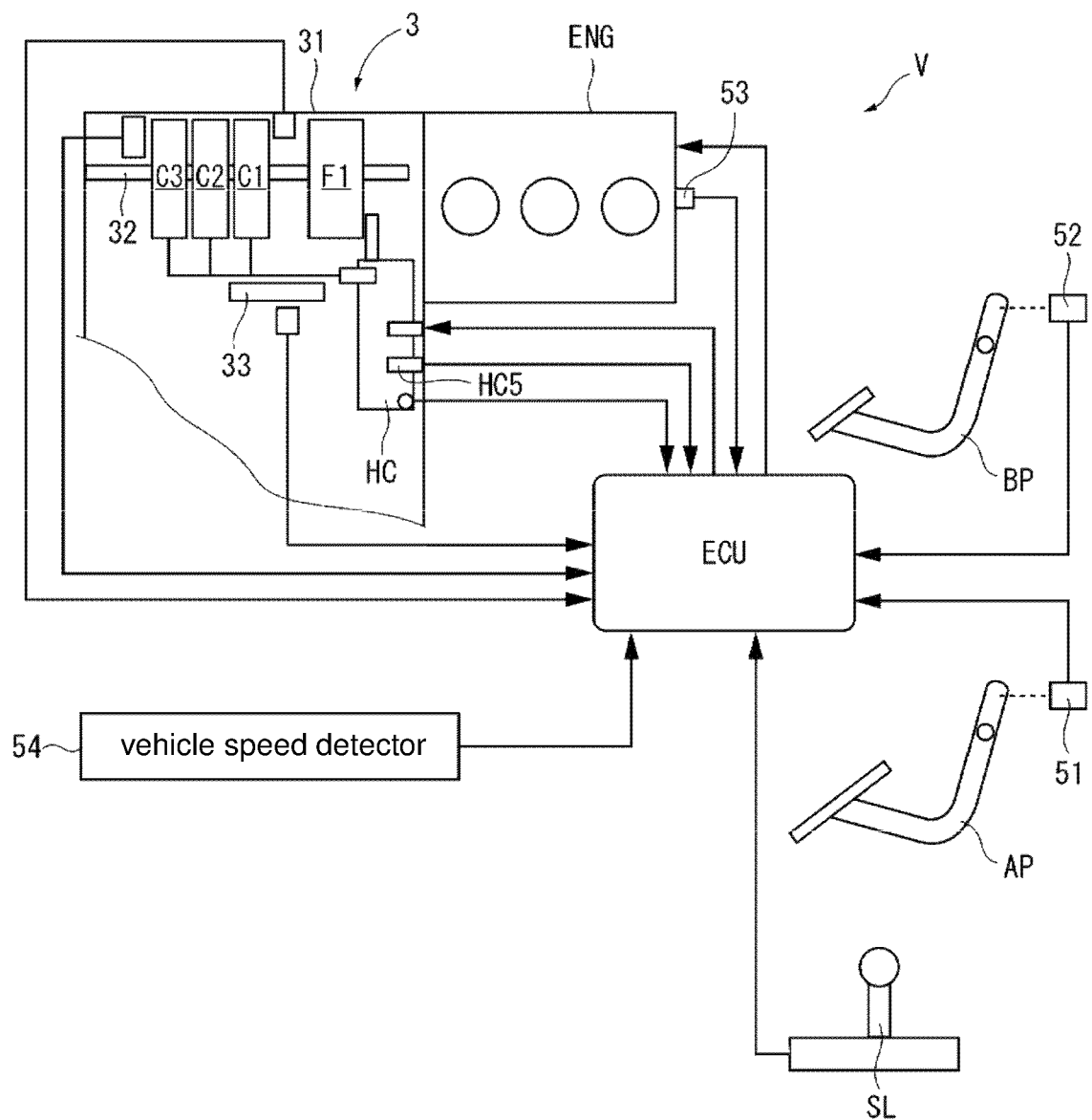
FIG. 10 is an explanatory view schematically illustrating various sensors and a control part of the transmission mounted on the vehicle of FIG. 1.

As illustrated in FIG. 10, the vehicle V includes a shift lever SL which is capable of switching a shift position (gear shift stage) to one of a forward range, a neutral range and a reverse range, an accelerator opening degree detector 51 which detects on/off of an accelerator pedal AP, a brake pedal detector 52 which detects on/off of the brake pedal BP, a driving source rotation speed detector 53 (driving source output detector) which detects an rotation speed of the engine E, and a vehicle speed detector 54 (output member rotation speed detector) which detects a vehicle speed.

The transmission 3 mounted in the vehicle V includes the hydraulic control circuit HC performing the switching operation of the two-way clutch F1 (switching mechanism), the first clutch C1 (frictional engagement mechanism), the second clutch C2 (frictional engagement mechanism) and the third clutch C3 (frictional engagement mechanism) which are hydraulically actuated wet multiple disk clutches and supplying the hydraulic pressure and the lubricating oil (lubricating fluid) to them. The hydraulic control circuit HC has an oil temperature detector HC5 (temperature detector) which detects a temperature of the lubricating oil.

The control part ECU receives information of the shift position from the shift lever SL, information of the rotation speed of the engine E from the driving source rotation speed detector 53, information of the vehicle speed from the vehicle speed detector 54 (that is, information of the rotation speed of the output member 33), and information of the temperature of the lubricating oil from the oil temperature detector HC5.

However, in the first clutch C1, the second clutch C2 and the third clutch C1 which are hydraulically actuated wet multiple disk clutches, since the lubricating oil is supplied from the hydraulic control circuit HC, lubricating oil is present between the friction members forming these clutches when these clutches are in the open state.

Therefore, even when the first clutch C1, the second clutch C2 and the third clutch C3 are in the open state (that is, in a state in which there is an interval between friction members), a force (friction torque) may be unexpectedly transmitted to the element corresponding to the frictional engagement mechanism due to viscous resistance of the lubricating fluid present between the friction members. Additionally, the friction torque may be transmitted to the two-way clutch F1 via a predetermined element (carrier Cb) corresponding to the two-way clutch F1.

As a result, in the transmission 3, although the first clutch C1, the second clutch C2 and the third clutch C3 are in the open state, a force which fixes the state is applied to the two-way clutch F1, and thus even when the switching of the two-way clutch F1 from the fixed state to the reverse rotation prevention state is instructed, the switching may not be performed smoothly.

For example, as illustrated in FIG. 4, in the first gear stage, the first clutch C1, the second clutch C2 and the third clutch C3 are in the open state. Meanwhile, the two-way clutch F1 is in the reverse rotation prevention state "R" during normal travelling, but it is necessary for it to be switched to the fixed state "L" when the engine brake is applied.

In the first gear stage, when the two-way clutch F1 is in the fixed state, the normal rotation prevention side swinging portion TW13 of the two-way clutch F1 is in a state of protruding from the first notch hole TW20a (refer to FIGS. 5 and 7) and prevents the rotation of the rotating plate TW12 by the first end TW13a which is a distal end thereof.

At this time, there is concern that a force in the normal rotation direction (that is, a fixing force) may be unexpectedly applied from the rotating plate TW12 to the normal rotation prevention side swinging portion TW13 by the friction torque.

In a state in which the fixing force is applied, even when the switching plate TW20 is brought into contact with the normal rotation prevention side swinging portion TW13 (in FIG. 5, from the right side in the drawing) to perform the switching, it is not easy to move the normal rotation prevention side swinging portion TW13 in the direction for being accommodated in the first accommodating portion TW15 (that is, performing the switching). Additionally, when it is forced to move, there is also a possibility that a large impact may be generated when the normal rotation prevention side swinging portion TW13 moves.

Therefore, on the basis of a process which will be described below with reference to FIGS. 10 to 13, the control part ECU controls the timing at which the two-way clutch F1 is switched from the fixed state to the reverse rotation prevention state so that the switching can be performed smoothly.

Figure 11:
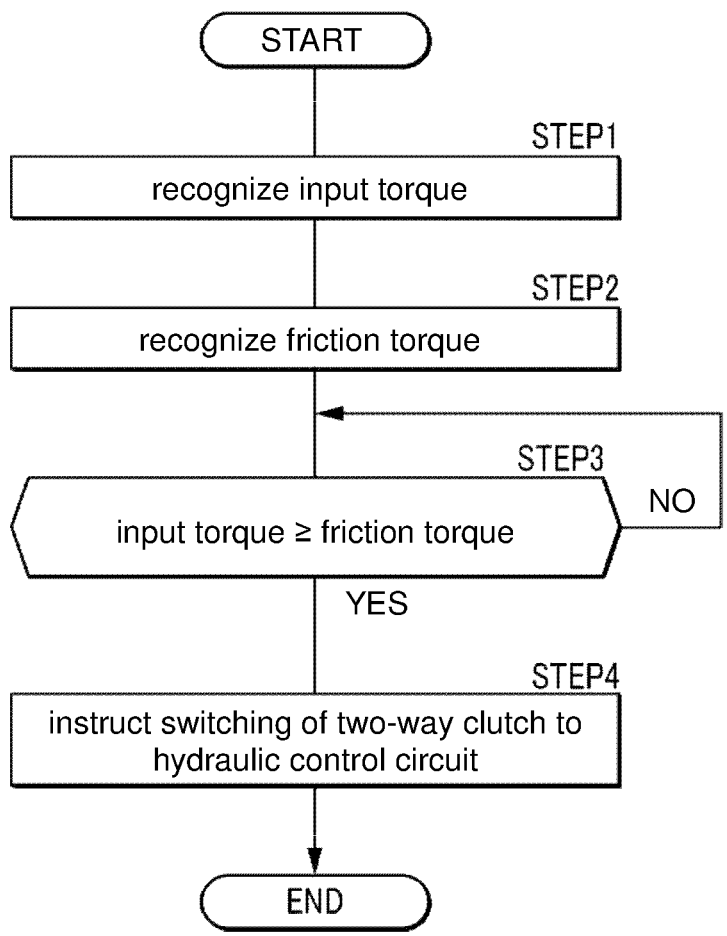
FIG. 11 is a flowchart illustrating a process which is performed when the control part of the transmission mounted on the vehicle of FIG. 1 switches the two-way clutch from the fixed state to the reverse rotation prevention state.

When an instruction to switch the two-way clutch F1 from the fixed state to the reverse rotation prevention state is received, the control part ECU first recognizes the input torque (FIG. 11/STEP 1).

Specifically, the control part ECU recognizes the input torque by calculating on the basis of the information of the rotation speed of the engine E from the driving source rotation speed detector 53 and a property of the torque converter 2 which is a known value, and so on.

Further, the input torque varies on the basis of an output of the engine E. Here, the "output" of the engine E includes a torque in addition to the rotation speed. Therefore, in addition to the above-described recognition method, a method of recognizing a value of the input torque may be a method in which the rotation speed of the input shaft 32 or the torque of the engine E is measured and the value is calculated on the basis of the measured value. Alternatively, it may be acquired from a data table obtained in advance on the basis of the rotation speed of the engine E or the like.

Next, the control part ECU recognizes the friction torque (FIG. 11/STEP 2).

Specifically, the control part ECU recognizes the friction torque from the data table obtained in advance on the basis of the information of the vehicle speed from the vehicle speed detector 54 and the information of the temperature of the lubricating oil from the oil temperature detector HC5.

Further, the friction torque varies on the basis of the rotation speed of the output member 33. Therefore, in addition to the above-described recognition method, a method of recognizing a value of the friction torque may be a method of acquiring this from a data table obtained in advance with reference to only the rotation speed of the output member 33 (for example, only the vehicle speed based thereon). In control according to the embodiment, the reason for referring to the oil temperature is because the viscous resistance changes according to the temperature of the lubricating oil and thus the friction torque caused by the lubricating oil is greatly affected by the oil temperature.

Next, the control part ECU determines whether or not the value of the input torque is equal to or greater than the value of the friction torque (FIG. 11/STEP 3).

When the value of the input torque is less than the value of the friction torque (NO in STEP 3), the control part ECU determines whether or not the value of the input torque is equal to or more than the value of the friction torque at predetermined control intervals (for example, every 10 msec).

Figure 12:
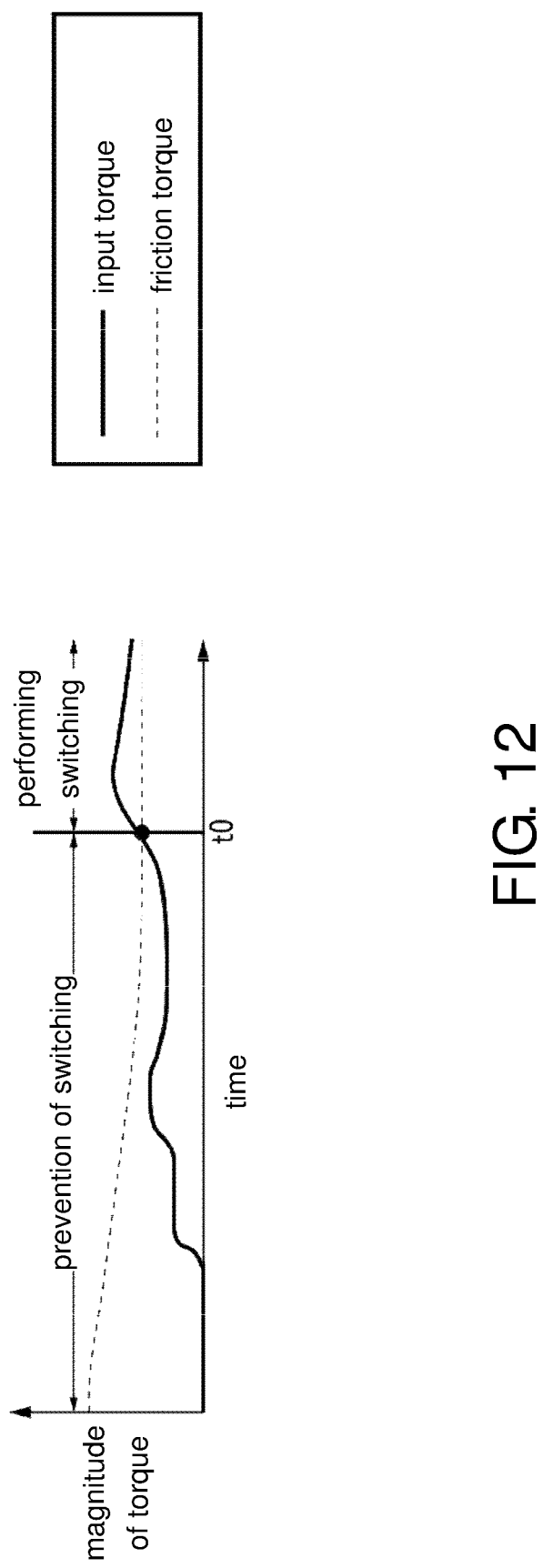
FIG. 12 is a graph illustrating change with time of an input torque and a friction torque applied to the two-way clutch in the vehicle of FIG. 1, wherein a vertical axis indicates a magnitude of the torque and a horizontal axis indicates time.

As illustrated in a graph of FIG. 12, since the input torque and the friction torque change with elapse of time, by repeatedly making a determination in such a short period, the transmission 3 can immediately perform the switching when the value of the input torque becomes equal to or greater than the value of the friction torque (t0 in FIG. 12).

On the other hand, when the value of the input torque is equal to or greater than the value of the friction torque (YES in STEP 3), the control part ECU instructs the hydraulic control circuit HC to switch the two-way clutch F1 from the fixed state to the reverse rotation prevention state (FIG. 11/STEP 4).

The control part ECU terminates the switching process of the two-way clutch F1 through the above-described processing.

As described above, in the transmission 3, the control part ECU switches the two-way clutch F1 from the fixed state to the reverse rotation prevention state in a state in which the input torque is equal to or greater than the friction torque (that is, a state in which the fixing force is not applied to the normal rotation prevention side swinging portion TW13). Therefore, according to the transmission 3, it is possible to smoothly switch the two-way clutch F1.

However, in the above-described control performed by the control part ECU, the friction torque is recognized by acquiring this from the data table obtained in advance on the basis of the information of the vehicle speed from the vehicle speed detector 54 and the information of the temperature of the lubricating oil from the oil temperature detector HC5. This is because the vehicle speed (that is, the rotation speed of the output member 33) and the oil temperature greatly influence the friction torque.

Figure 13:
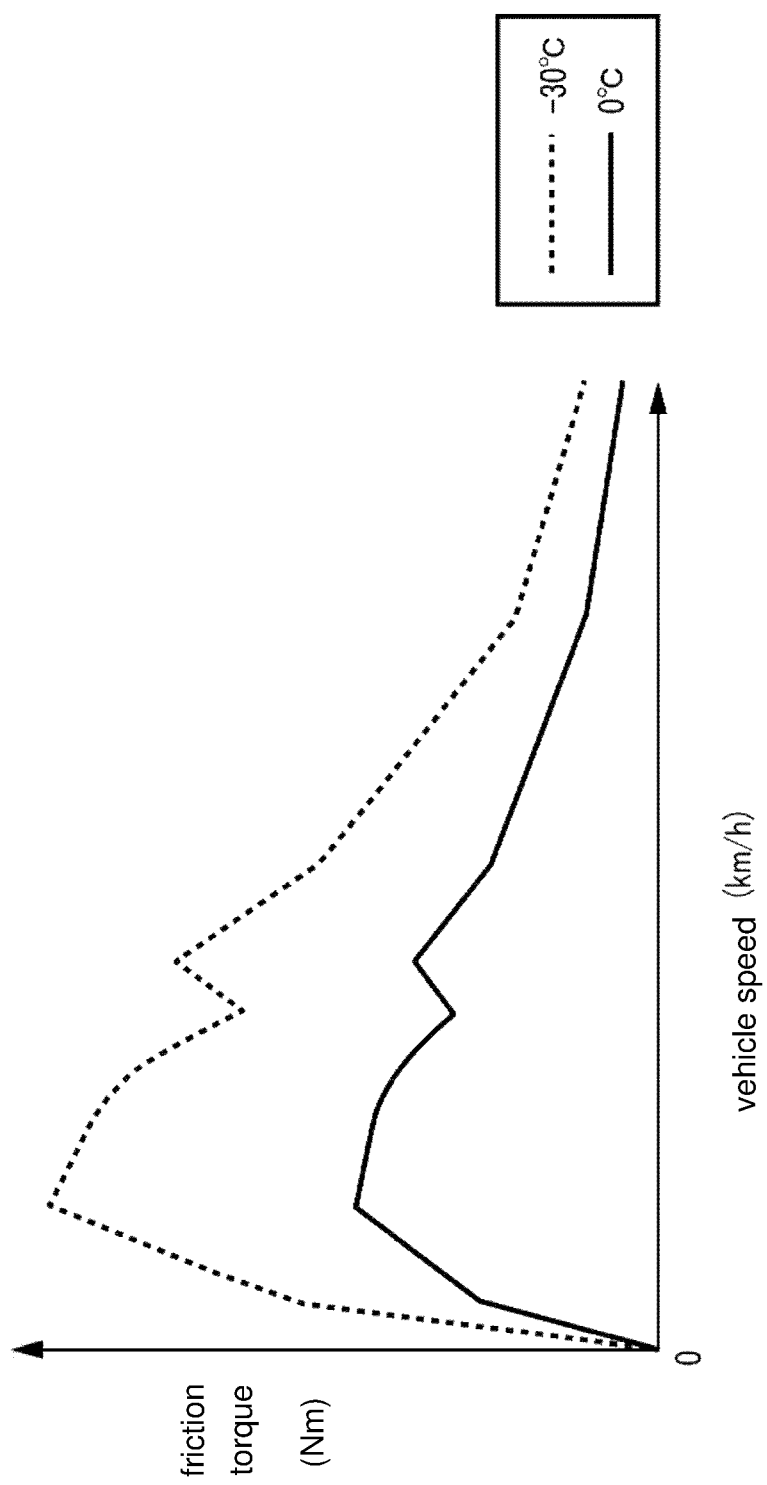
FIG. 13 is a graph illustrating change in friction torque applied to a two-way clutch in the vehicle of FIG. 1 due to a vehicle speed, wherein a vertical axis indicates a magnitude of the friction torque and a horizontal axis indicates the vehicle speed.

Meanwhile, as illustrated in FIG. 13, when the vehicle speed is somewhat high, or when the oil temperature is high to a certain extent, the friction torque may become negligibly small. Therefore, in this case, the above-described control may be omitted.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An automatic transmission, comprising:
an input member disposed inside a casing and configured to rotate by receiving a driving force from a driving source;
a planetary gear mechanism having a plurality of elements rotatable inside the casing;
a plurality of engagement mechanisms which are switchable to a connected state in which the plurality of elements are connected to each other or are switchable to a fixed state in which the plurality of elements are fixed to the casing;
an output member configured to output rotation; and
a control part configured to control the engagement mechanisms,
wherein the automatic transmission is mounted in a vehicle, the vehicle transfers a rotation of the input member into a plurality of gear shift stages by the planetary gear mechanism and the engagement mechanism and outputs from the output member,
the automatic transmission further comprising:
a lubricating fluid supply mechanism configured to supply a lubricating fluid to one of the plurality of elements;
an output member rotation speed detector configured to detect an rotation speed of the output member; and
a driving source output detector configured to detect an output of the driving source,
wherein each of the plurality of engagement mechanisms comprises:
a switching mechanism corresponding to a predetermined element among the plurality of elements and capable of switching between a reverse rotation prevention state configured to allow normal rotation of the predetermined element and to prevent reverse rotation of the predetermined element, and the fixed state, and
a frictional engagement mechanism capable of switching between the connected state or the fixed state and an open state for releasing the connected state or the fixed state is released,
the switching mechanism comprises a first member fixed to the casing, a second member connected to the predetermined element corresponding to the switching mechanism and configured to perform normal rotation or reverse rotation with respect to the first member, and a switching member installed on the first member and engageable with the second member,
the switching member prevents normal rotation of the second member at a time of engaging with the second member and causes the predetermined element corresponding to the switching mechanism to be in the fixed state and allows normal rotation of the second member at a time of not engaging with the second member and causes the predetermined element corresponding to the switching mechanism to be in the reverse rotation prevention state,
an input torque varying on a basis of the output of the driving source and a friction torque generated in a direction opposite to the input torque are input to the second member, wherein the friction torque is generated by the lubricating fluid present inside the frictional engagement mechanism and varying on a basis of the rotation speed of the output member, and the control part recognizes the input torque and the friction torque when an instruction to switch the switching mechanism from the fixed state to the reverse rotation prevention state is received while the frictional engagement mechanism is in the open state, and switches the switching mechanism from the fixed state to the reverse rotation prevention state while the input torque is equal to or greater than the friction torque.

2. The automatic transmission according to claim 1, further comprising a temperature detector configured to detect a temperature of the lubricating fluid, wherein the control part recognizes the friction torque applied to the switching mechanism due to the lubricating fluid present inside the frictional engagement mechanism on a basis of the rotation speed of the output member and the temperature.

* * * * *